US007405380B2

(12) United States Patent
Obata et al.

(10) Patent No.: US 7,405,380 B2
(45) Date of Patent: Jul. 29, 2008

(54) PORTABLE ELECTROMAGNETIC INDUCTION HEATING DEVICE

(75) Inventors: Shuji Obata, Saitama (JP); Masataka Tanimitsu, Saitama (JP); Hideo Tomita, Saitama (JP); Shinzo Yoshimura, Saitama (JP); Kunihiko Suzuki, Saitama (JP)

(73) Assignee: Tokyo Denki University, Tokyo (JP)

( * ) Notice: Subject to any disclaimer, the term of this patent is extended or adjusted under 35 U.S.C. 154(b) by 303 days.

(21) Appl. No.: 10/558,946

(22) PCT Filed: Dec. 12, 2003

(86) PCT No.: PCT/JP03/15972

§ 371 (c)(1),
(2), (4) Date: Nov. 30, 2005

(87) PCT Pub. No.: WO2004/107820

PCT Pub. Date: Dec. 9, 2004

(65) Prior Publication Data

US 2007/0023422 A1 Feb. 1, 2007

(30) Foreign Application Priority Data

May 30, 2003 (JP) ............................ 2003-154582
Sep. 2, 2003 (JP) ............................ 2003-310457

(51) Int. Cl.
*H05B 6/10* (2006.01)
*B23K 13/01* (2006.01)

(52) U.S. Cl. ...................................... 219/633; 219/603

(58) Field of Classification Search ................. 291/600, 291/618, 633, 603, 602
See application file for complete search history.

(56) References Cited

U.S. PATENT DOCUMENTS

| | | | | |
|---|---|---|---|---|
| 4,845,326 A * | 7/1989 | Rudd et al. | ................. | 219/610 |
| 6,180,932 B1 * | 1/2001 | Matsen et al. | ............... | 219/615 |
| 6,184,509 B1 * | 2/2001 | Scott et al. | .................. | 219/633 |
| 6,652,446 B1 * | 11/2003 | Bove et al. | ..................... | 600/15 |
| 6,858,083 B2 * | 2/2005 | Sterud et al. | ............. | 156/380.2 |
| 2007/0000181 A1 * | 1/2007 | Smushkovich | .................... | 52/1 |
| 2007/0122213 A1 * | 5/2007 | Iwahashi et al. | ............ | 399/328 |

FOREIGN PATENT DOCUMENTS

| | | |
|---|---|---|
| JP | 63-178097 | 11/1988 |
| JP | 63-308080 | 12/1988 |
| JP | 5-340058 | 12/1993 |
| JP | 6-100840 | 4/1994 |
| JP | 8-73818 | 3/1996 |
| JP | 10-223363 | 8/1998 |
| JP | 2001-210457 | 8/2001 |
| JP | 2002-168226 | 6/2002 |
| JP | 2002-371252 | 12/2002 |

* cited by examiner

*Primary Examiner*—Daniel L Robinson
(74) *Attorney, Agent, or Firm*—McCormick, Paulding & Huber LLP

(57) ABSTRACT

This portable electromagnetic induction heating device is used to carry an induction current in a conductor, make the conductor generate heat by Joule's heat, and heat adhesive by the heat generating conductor. A heating induction coil (13*a*) is formed by a plurality of coil bodies (21-24 and 51-54), the respective coil bodies can change mutually center-to-center distances. Simultaneously, by changing any one of polarities thereof, a polarity and a position of a magnetic force line generated by the conductor are changed, whereby a heating state of the adhesive can be changed depending on a region of the adhesive.

1 Claim, 11 Drawing Sheets

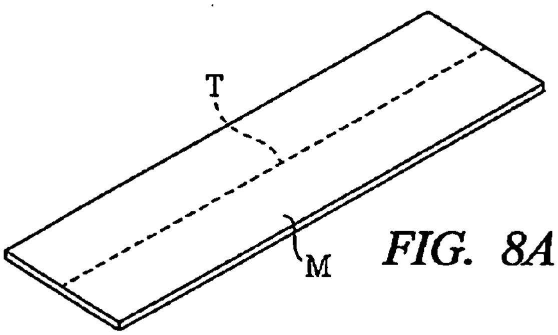
FIG. 8A
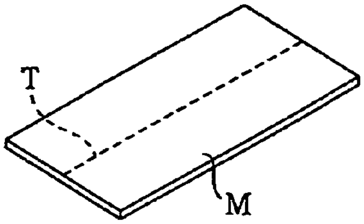
FIG. 8B
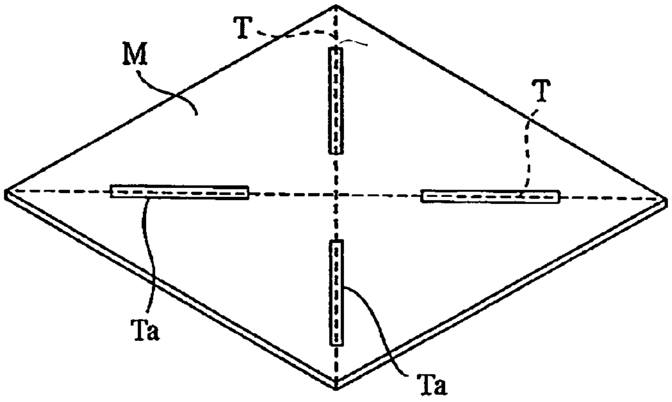
FIG. 8C
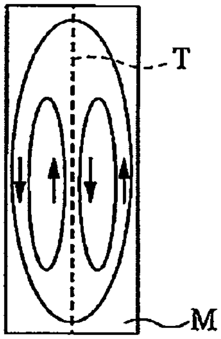
FIG. 9A
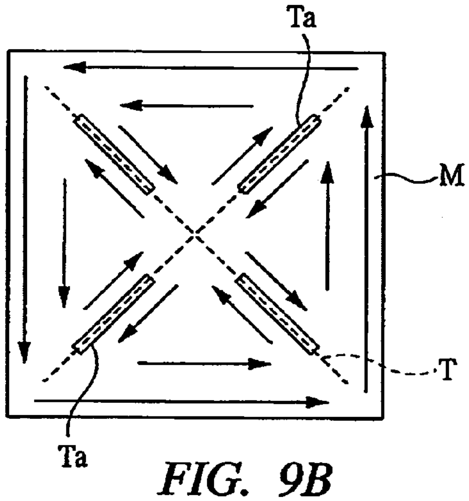
FIG. 9B
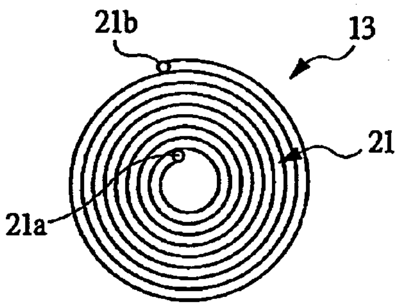
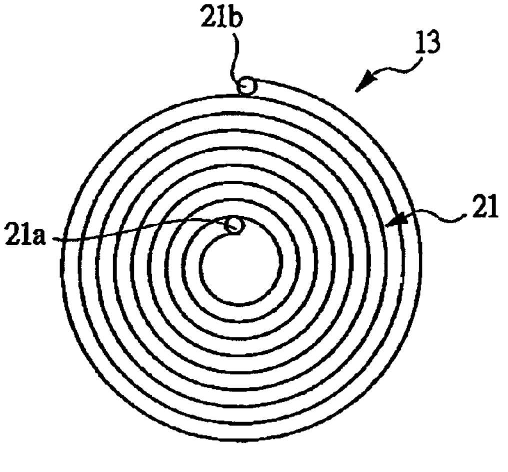

PORTABLE ELECTROMAGNETIC INDUCTION HEATING DEVICE

CROSS REFERENCE TO RELATED APPLICATIONS

This application is entitled to the benefit of and incorporates by reference essential subject matter disclosed in International Patent Application No. PCT/JP2003/015972 filed on Dec. 12, 2003, Japanese Patent Application No. 2003-154582 filed May 30, 2003 and Japanese Patent Application No. 2003-310457 filed Sep. 2, 2003.

TECHNICAL FIELD

The present invention relates to a portable electromagnetic induction heating device for making a conductor generate heat by electromagnetic induction heating and for heating adhesive.

BACKGROUND OF THE INVENTION

In order to bond a conductive member such as metal and a nonconductive member such as wood by the adhesive, a technique for making the conductive member generate heat by an induction coil, i.e., a heating coil and for heating the adhesive is disclosed in Japanese Patent Laid-Open Publication No. 8-73818. Also, in order to bond the nonconductive members to each other, a technique for interposing between the nonconductive members a metal sheet to whose surfaces adhesive layers are applied and for heating the adhesive layers and bonding the nonconductive members by making the metal sheet generate heat by the induction coil is disclosed in Japanese Patent Laid-Open Publication Nos. 63-308080, 5-340058, and 6-100840.

In these techniques, when a high-frequency current is supplied to the induction coil, magnetic force lines of an alternating magnetic field generated by the induction coil penetrate the conductive member and the metal sheet and an electromotive force is created in the conductive member such as the metal sheet by the electromagnetic induction effect As a result, an induction current flows in the conductive member and the Joule's heat is generated and the heat is transmitted to the adhesive, so that the adhesive is heated. This electromagnetic induction heating device carries the high-frequency current in the induction coil to create an eddy current, whereby a particular portion can be quickly made to generate heat Therefore, by making the conductive members generate heat, interior materials and exterior materials of a building can be bonded to a building body in a short time. Simultaneously, the interior materials and exterior materials can be peeled off in a short time in remodeling the building, so that the peeled interior materials and exterior materials can be recycled.

When such an electromagnetic induction heating device is used, operation efficiency of assembling the interior materials can be improved in comparison with the cases of attaching the interior materials to a building frame by, for example, nails, screws, and rivets. More specifically, when the interior materials are to be assembled by nails or the like, heads of the nails protrude from surfaces of the interior materials, so that the heads have to be concealed by ornaments or the like and further noise is generated during construction. Meanwhile, when the solvent adhesive is used to bond the interior materials or the like to the building frame by the adhesive, the noise is not generated. However, it takes time to cure until the adhesive solidifies.

In contrast, when the electromagnetic induction heating device with the induction coil is made to heat and melt thermoplastic adhesive and then cool and solidify it, the adhesive can be not only heated and melted but also solidified in a short time, so that a time required for constructing the building can be largely shortened. As described above, it has been found out that an adhesive heating method for heating the adhesive interposed between the conductive member such as metal and the nonconductive member such as wood by the electromagnetic induction heating device and for bonding both members or, in order to bond the nonconductive members to each other, an adhesive heating method for interposing between the nonconductive members the metal sheet to whose surfaces the adhesive layers are applied, heating the adhesive, and boding both members can be applied for various uses, for example, the cases of assembling a large quantity of products such as automobiles and electronic devices and of bonding the sheet-like members to one another without being limited to the interior materials and exterior materials of the building. For example, regarding automobile parts or the like produced by combining resin members and metal members, a production time can be shortened and concurrently the used parts can be disassembled by melting the adhesive and be reused.

As a conventional electromagnetic induction heating device, a coil formed into a disk-like shape by spirally winding a coil material has been used. Generally, a little eddy current is generated in a portion of a conductor facing a center portion of such a spiral round coil and, consequently, the coil has the characteristic that heating temperature of the adhesive at a portion corresponding to the center portion becomes low. When two members are to be bonded by the adhesive, heating the metal sheet by using the conventional coil is limited to donut-shaped heating or heating dependent on a donut-shaped induced electromotive force and a shape of the metal sheet. Therefore, limit has been imposed on the heating of target regions of the metal sheets of various shapes. For example, in heating a rectangular tape, only both ends of a tape portion facing the coil center portion are heated, whereby an end-burnt phenomenon is caused and there is in a state of being not usable in practice. Countermeasures of the conventional techniques include a hole-strewed tape and a tape whose both ends are cut into wave-like shapes. However, these are insufficient as the burnt-end countermeasures, and involve risks of fire. For bonding of, for example, tiles that require wide-region bonding, there is no corresponding model among conventional devices, so that since these devices aim at only regions capable of being heated by the conventional coils, the heating of the center portion and corner portions becomes insufficient. In the bonding of tiles, the respective induction coils capable of corresponding to the heating of only edge portions and an entire surface are required.

Moreover, in order to melt the adhesive applied on the wide region in a short time, the large current has to flow in the induction coil. In the electromagnetic induction devices developed thus far, the current amount has been limited in terms of electrical power, heating efficiency is low, and control of the bonding region is limited. The present invention provides actually practical techniques which compensate for such problems of the conventional techniques.

Meanwhile, several techniques for utilizing iron cores in induction heating coils are known. Such an iron core depends on a kind and shape of a magnetic conductor, normal conductor, or the like used as unheated metal, so that the optimum polarity and shape of the core are specified with respect to heating conditions. In the conventional techniques, the core shape optimum to the heating conditions is not considered, and a U-shaped, E-shaped, or T-shaped core is uniformly used presently.

In the present invention, the magnetic poles and the shapes of a core portion can be changed under design in which a generation state of a magnetic flux loop relating to a magnetic flux emitting portion and a magnetic flux collecting portion of the core is considered with respect to the kind, shape, and position of unheated metal and to the heating conditions, whereby the above problems are solved. In terms of techniques, this is the same case as the case of changing of the position and polarity of the spiral coil. However, uniform heating of a large area, which cannot be performed by the conventional techniques, is prevented by such design that ends of the core are increased. Also, regarding control of the heating time, if the bonding portion is an ignitable member, over heating is extremely dangerous, so that detecting the heating temperature and controlling the supplied power are essential. The conventional techniques lack consideration for performing such strict heating control. The present invention provides specific techniques for solving the practical problems.

BRIEF SUMMARY OF THE INVENTION

An object of the present invention is to provide a portable electromagnetic induction heating device with small size and light weight.

Another object of the present invention is to provide a portable electromagnetic induction heating device capable of carrying a large amount of currents in an induction coil.

Another object of the present invention is to provide a portable electromagnetic induction heating device capable of aligning a region of a heating portion so as to correspond to a shape, perforations, and incisions of a conductor to be heated.

A portable electromagnetic induction heating method of the present invention is a method for carrying an induction current in a conductor, making said conductor generate heat by Joule's heat, and heating adhesive by the heat generating conductor, and comprises the steps of: connecting in series a plurality of coil bodies to form a heating induction coil generating a magnetic force line supplied to said conductor by a high-frequency current from a high-frequency generation circuit; and changing a center distance of said plurality of coil bodies or reversing at least any one of said coils upside down to change a polarity and a position of the magnetic force lines formed by said heating induction coil.

A portable electromagnetic induction heating method of the present invention is a method for carrying an induction current in a conductive sheet to whose surface adhesive is applied, making said sheet to generate heat by Joule's heat, and heating the adhesive by the heat generating sheet, and comprises the steps of forming a resistance barrier portion constituted by an incision, a perforation, or the like in said sheet in which the induction current is generated by a magnetic force line of a heating induction coil to which a high-frequency current is supplied from a high-frequency generation circuit; and changing the number of eddies and flow of an eddy current generated in said sheet to adjust a heat generation distribution.

A portable electromagnetic induction heating method of the present invention is a method for carrying an induction current in a conductor, making said conductor generate heat by Joule's heat, and heating adhesive by the heat generating conductor, and comprises the steps of: supplying a high-frequency current from a high-frequency generation circuit, to a heating induction coil generating a magnetic force line supplied to said conductor, and controlling a current carrying time to said heating induction coil based on a detection signal from a temperature sensor detecting temperature and temperature variation of said adhesive.

A portable electromagnetic induction heating device of the present invention is a device for carrying an induction current in a conductor, making said conductor generate heat by Joule's heat, and heating adhesive by the heat generating conductor, and comprises: a power-supply unit for supplying electric power; a heating head provided with a high-frequency generation circuit for converting a current supplied from said power-supply unit to a high-frequency current; and a heating induction coil to which a current from the high frequency generation circuit is supplied and which generates an induction current in said conductor, wherein said heating induction coil has a facing surface including a flat surface or curved surface facing said conductor, and is formed by a coil body with a shape of a single or plurality of circles, ovals, or polygons to be capable of surface-heating a complex three-dimensional curved surface.

The portable electromagnetic induction heating device of the present invention is such that efficiency of generating an eddy current is improved by winding said coil body around a magnetic core with a tip surface facing said conductor and by forming a magnetic circuit concentrating a facing magnetic force line and converging a magnetic force line in a space opposite to the conductor.

The portable electromagnetic induction heating device of the present invention is such that a region of the generated eddy current is adjusted by connecting windings of a plurality of said magnetic cores at respective rear ends thereof and by changing a polarity and a position of a magnetic force line formed by said heating induction coil.

According to the present invention, the heating induction coil is formed by connecting the plurality of coil bodies in series, so that since the center-to-center distances of the coil bodies are changed or/and the coil bodies are reversed upside down, the polarity and position of the magnetic force line can be changed, which makes it possible to perform the heating in a state suitable for the conductor serving as an object to be heated.

According to the present invention, when the conductor is formed into a sheet-like shape and the adhesive applied to the surface of the sheet-like conductor is heated, by forming the resistance barrier portion formed by an incision or the like in the sheet, the flow of the eddy current in one sheet can be changed and the heat generation distribution can be changed.

According to the present invention, the heating temperature can be controlled by detecting the temperature of the adhesive and automatically adjusting the current carrying time.

According to the present invention, even when the conductor to be heated by the coil body has any of a flat surface and a complex three-dimensional curved surface, the conductor can be reliably heated.

According to the present invention, since the coil body is wound around the magnetic core, the magnetic force line generated by the coil body can be concentrated and the efficiency of generating the eddy current can be improved.

According to the present invention, since the heating induction coil is formed by the plurality of magnetic cores and the respective magnetic cores are connected at the rear ends, a leakage of the magnetic flux is prevented from occurring to intensively guide the magnetic force line to the conductor, whereby the efficiency of generating the eddy current can be improved.

According to the present invention, since the polarities of the magnetic force lines formed by the coil bodies are changed, the generation region of the eddy current can be adjusted and the conductor can be heated at the optimum temperature.

BRIEF DESCRIPTION OF THE DRAWINGS

Now having described the invention in general terms, embodiments of the invention shall be described in details with reference to the drawings in which:

FIGS. 8A to 8C are perspective views showing a modified example of metal foil to whose both surfaces adhesive is provided.

FIG. 9A is a plan view showing a state in which the metal foil shown in FIG. 8A is used and the adhesive provided on both surfaces thereof is heated; and FIG. 9B is a plan view showing a state in which the metal foil shown in FIG. 8B is used and the adhesive provided on both surfaces thereof is heated.

DETAILED DESCRIPTION OF THE INVENTION

Figure 1:
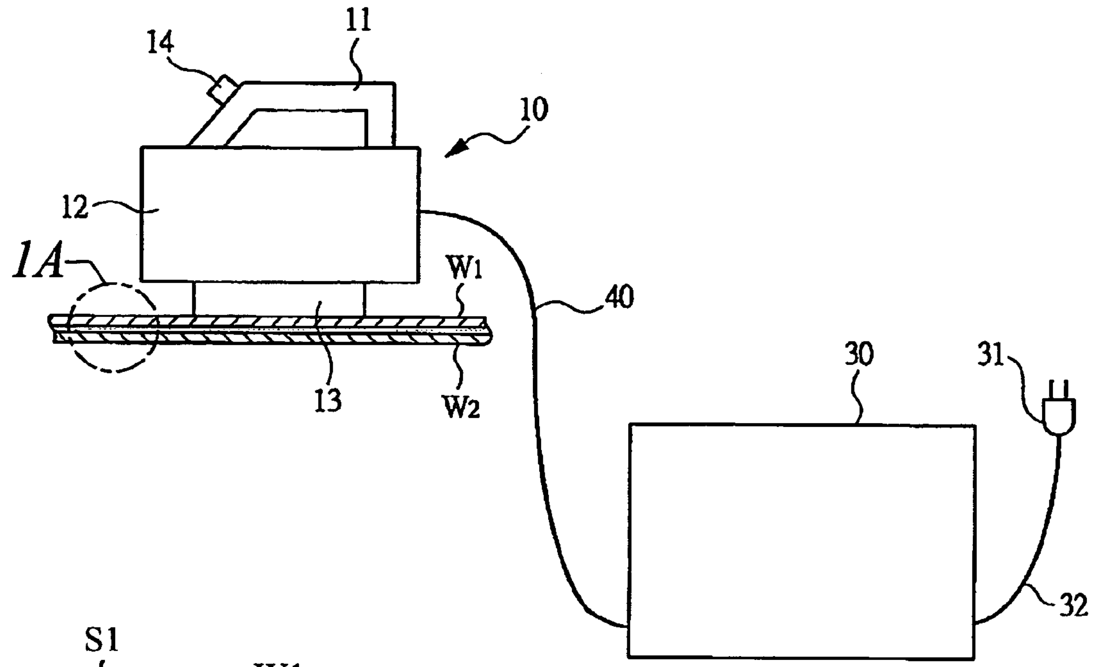
FIG. 1 is a schematic view showing an entire constitution of a portable electromagnetic induction heating device which is an embodiment of the present invention.
Figure 1A:
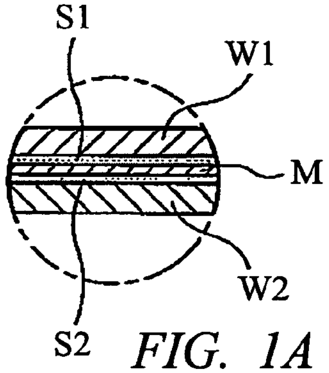
FIG. 1A is a partially enlarged view as indicated at 1A in FIG. 1.

In FIGS. 1 and 1A, a state in which two members W1 and W2 are bonded by thermoplastic adhesive is shown, and a conductive sheet M comprising metal foil to whose both surfaces adhesive S1 and S2 are applied is disposed between the two members W1 and W2. The sheet M is made of aluminum or steel. The sheet M comprising the metal foil which is a conductor, i.e., a conductive member is made to generate heat by an electromagnetic induction effect, and the adhesive S1 and S2 are heated by the heat to melt the adhesive in a short time in seconds, whereby the members W1 and W2 can be mutually bonded. If the metal foil is similarly made to generate heat by a portable electromagnetic induction heating device to melt the adhesive, the members W1 and W2 bonded by the adhesive can be peeled off from each other. By using the portable electromagnetic induction heating device shown in FIG. 1 in the above described manner, for example, when the respective members W1 and W2 are wood or plaster boards, nonconductive interior materials and exterior materials such as wood or plaster boards can be bonded to a building frame in constructing a building such as a house and the materials can be peeled off when the building are taken down or rebuilt. Note that although the metal foil is used as the conductive sheet M in FIG. 1, a metal net woven into a mesh can be used as a conductor instead of the metal foil.

The portable electromagnetic induction heating device has a heating head 10 and a power-supply unit 30, wherein these are connected by a cable 40. The cable 40 is detachably connected to the heating head 10 by a plug 40*a*, and all of a plurality of heater heads 10 are attachable/detachable with respect to the power-supply unit 30. Accordingly, among the plurality of heating heads 10 different in size, the arbitrary heating head 10 can be connected to the power-supply unit 30. The heating head 10 has a head body 12 to which a handle 11 is provided, wherein a coil unit 13 is provided to a front surface of the head body 12. If the coil unit 13 is set to become attachable/detachable to the head body 12, the coil unit 13 with arbitrary size can be attached to the single head body 12 by preparing a plurality of coil units 13.

As the power-supply unit 30, a unit having a rectifier circuit for converting commercial power supply used in household or the like to DC power supply or a unit having a charging type battery in addition to a rectifier circuit for converting AC power supply to the DC power supply can be used, whereby the size and weight of the power-supply unit 30 can be reduced. Furthermore, a unit having only a battery can be used as the power-supply unit 30.

Figure 2B:
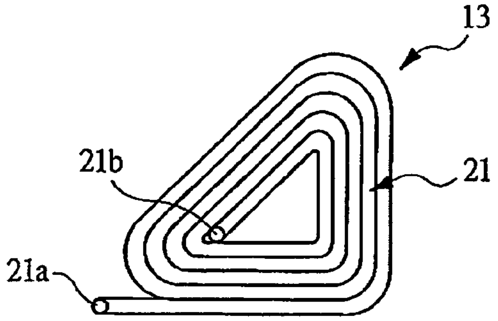
FIG. 2B is a plan view showing a modified example of the heating induction coil.
Figure 2A:
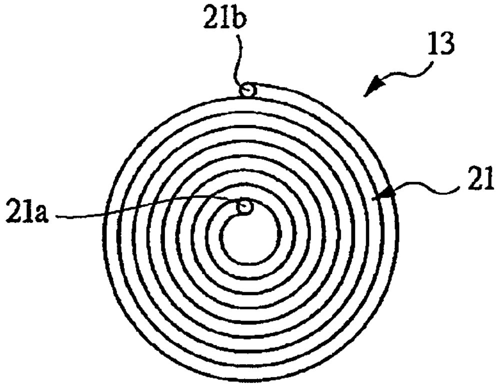
FIG. 2A is a plan view showing a heating induction coil in FIG. 1.

FIG. 2A is a view showing a heating induction coil 13*a* provided in the coil unit 13, and the heating induction coil 13*a* is formed by a single coil body 21 in the case shown in FIG. 2A. Contact terminals 21*a* and 21*b* are provided inside and outside the coil body 21, respectively. In the case of such a heating head 10 in which the coil unit 13 having a single coil body 21 is provided, a magnetic force line of an alternating magnetic field created by the coil body 21 becomes largest at a center portion of coil width in a radial direction of the coil body 21, and an electromotive force created in the conductor becomes strongest at a portion corresponding to the center portion of the coil width in the radial direction of the coil body 21. Accordingly, temperature of the adhesive becomes highest at an annular portion. Note that the coil body 21 is covered with a heat-resistant resin so as to be integrally formed, but may be covered with a resin so as to affect rigidity to the coil body 21 or be made deformable so as to be readily deformed. The coil body is deformable, so that even when a surface of an object to be heated is a complex three-dimensional curved surface, the surface of the coil body 21 is deformed so as to correspond to the surface of the object to be heated and the object to be heated can be heated in an optimum state.

Figure 2C:
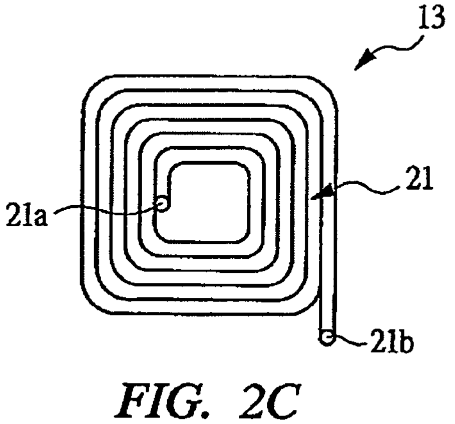
FIG. 2C is a plan view showing another modified example of the heating induction coil.

The coil body 21 shown in FIG. 2A is round. However, it may be approximately triangular as shown in FIG. 2B or approximately quadrangular as shown in FIG. 2C.

FIG. 3 shows a heating induction coil 13*a* comprising two coil bodies 21 and 22, wherein each of the coil bodies 21 and 22 is formed by spirally winding a coil material. Each of the coil bodies 21 and 22 has a half-round portion and a linear portion and has an oval shape in whole. The contact terminals 21*a* and 21*b* are provided to one end and the other end of the coil body 21, respectively. Similarly thereto, contact terminals 22*a* and 22*b* are respectively provided also to both ends of the coil body 22. The contact terminal 21*b* of the coil body 21 and the contact terminal 22*a* of the coil body 22 are connected to each other, so that both coil bodies 21 and 22 are connected in series.

The two coil bodies 21 and 22 are mutually stacked so that a center portion of the coil body 21 overlaps with the coil body 22, and at least one of the two coil bodies 21 and 22 is movable for adjustment along the other coil body so that a stacking position can be changed. Accordingly, positions of the magnetic force lines formed by the respective coil bodies 21 and 22 can be changed.

Figure 3A:
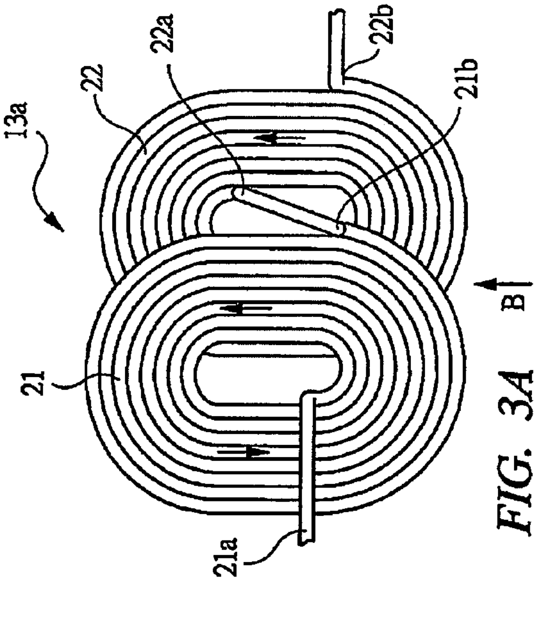
FIG. 3A is a plan view showing an example of the heating induction coil.
Figure 3B:
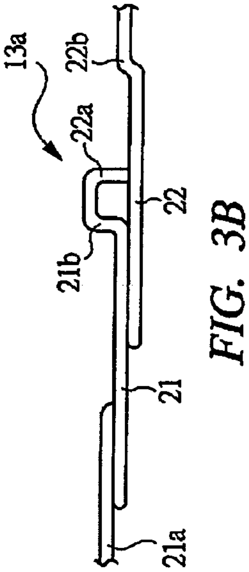
FIG. 3B is a front view seen from an arrow B in FIG. 3A.
Figure 3C:
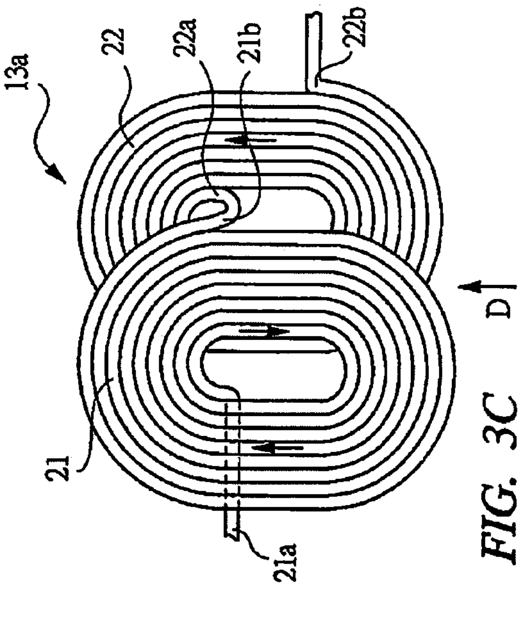
FIG. 3C is a plan view showing a state in which one of two coil bodies is reversed upside down.
Figure 3D:
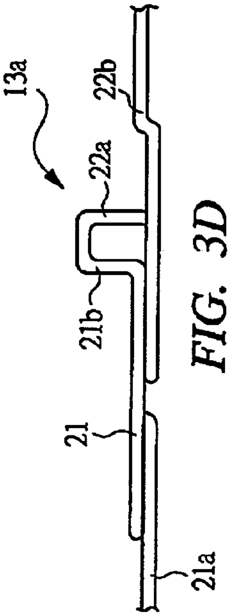
FIG. 3D is a front view seen from an arrow D in FIG. 3C.

Furthermore, one of the two coil bodies 21 and 22 can be reversed upside down. FIGS. 3C and 3D show a state in which the coil body 21 is reversed upside down from a state shown in FIGS. 3A and 3B. When the two coil bodies 21 and 22 are stacked in a manner as shown in FIGS. 3A and 3B, flows of currents in both coil bodies 21 and 22 are in the same direction and flows of currents in a stacked portion are in opposite directions to each other. In contrast, when the coil body 21 is reversed upside down as shown in FIGS. 3C and 3D from the state shown in FIGS. 3A and 3B, the flows of the currents in the coil bodies 21 and 22 are in the opposite directions and the flows of the currents in the stacked portion are mutually in the same direction. Accordingly, the polarities of the coil bodies 21 and 22 within the stacked portion change, and intensity of the magnetic force lines formed by the coil bodies 21 and 22 can be changed.

Figure 4:
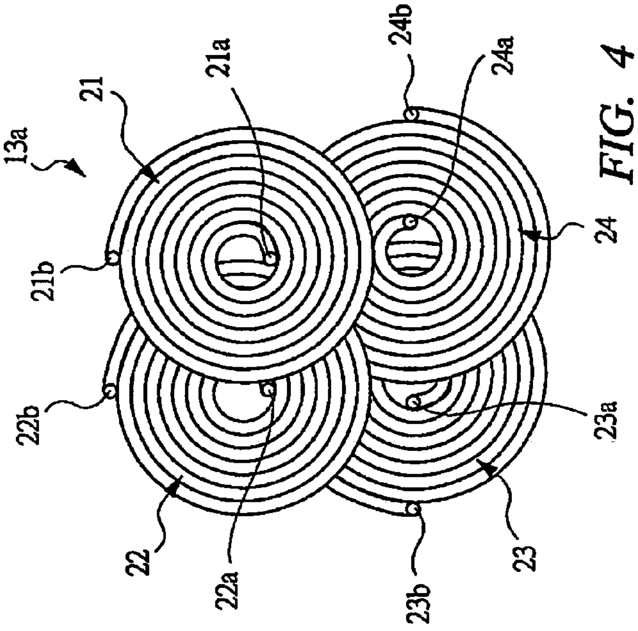
FIG. 4 is a plan view showing a modified example of the heating induction coil.

The heating induction coil 13*a* shown in FIG. 4 is formed by four coil bodies 21 to 24. Each of the coil bodies 21 to 24 is such that a coil material is spirally wound, and each of the coil bodies 21 to 24 is mutually stacked on another coil body. At least three of the four coil bodies 21 to 24 are movable for adjustment, so that they can be fixed by a stopper in a state in which a region of each overlapping portion is changed. Further, since a center position thereof is changed, an induction heating region can be adjusted to a necessary shape corresponding to that of a member to be heated.

In the case of the heating induction coil 13*a* shown in FIG. 4, a region in which all of four coil bodies are stacked and a region in which two of the coil bodies are stacked are formed depending on a stacked state, and the number of eddies of the generated eddy currents can be changed by the number of stacked coils. Contact terminals 21*a* and 21*b*, 22*a* and 22*b*, 23*a* and 23*b*, and 24*a* and 24*b* are provided at inner ends and outer ends of the respective coil bodies 21 to 24, so that when portions of the contact terminals are connected to the other coil bodies, the four coil bodies are connected in series.

Figure 5A:
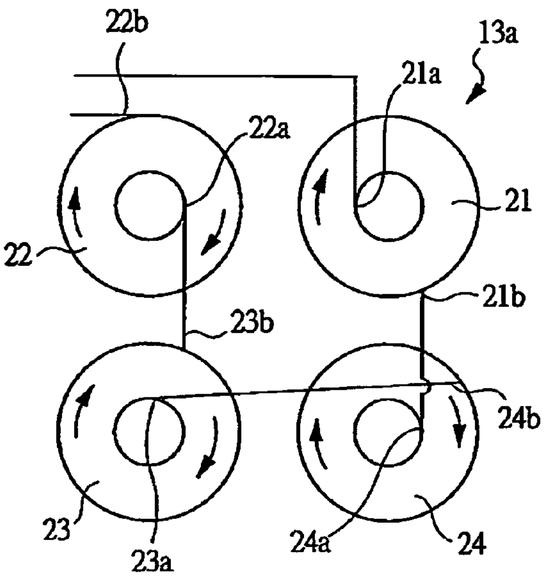
FIG. 5A is a schematic view showing a connection state of the heating induction coil shown in FIG. 4.
Figure 5B:
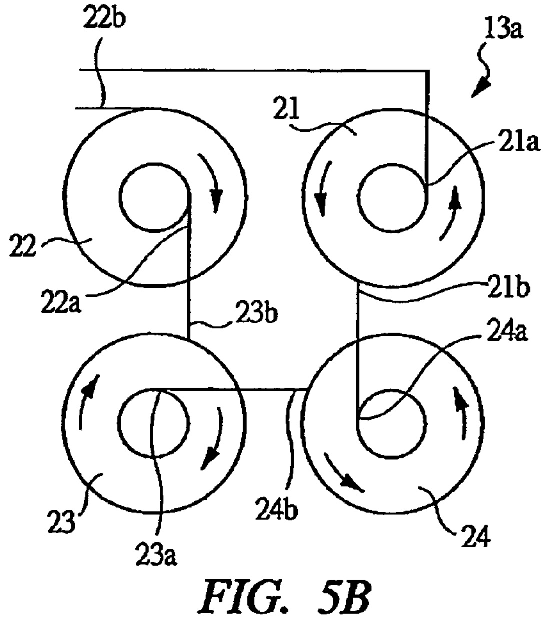
FIG. 5B is a schematic view showing another connection state.

FIG. 5A is a view showing an example of a connection state of the heating induction coil 13*a* shown in FIG. 4. When the coil bodies are connected and disposed to be stacked as shown in FIG. 5A, all of the flows of the currents in the four coil bodies 21 to 24 become in the same direction and, in the stacked portion, the flows of the currents in the two coil bodies 22 and 23 and the flows of the currents in the two coil bodies 21 and 24 are in opposite directions to each other. However, patterns occurring when the stacked region is small get closer to four independent coil patterns. In contrast, as shown in FIG. 5B, when the two coil bodies 21 and 24 are reversed upside down from an arrangement state shown in FIG. 5A, the flows of the currents in the two coil bodies 22 and 23 are mutually in the same direction and the flows of the currents in the two coil bodies 21 and 24 are mutually in the same direction. However, the flows of the currents in the two coil bodies 22 and 23 and those in the two coil bodies 21 and 24 are in the opposite directions to one another, so that the flows of the currents in the stacked portion of the coil bodies become mutually in the same direction.

Figure 5C:
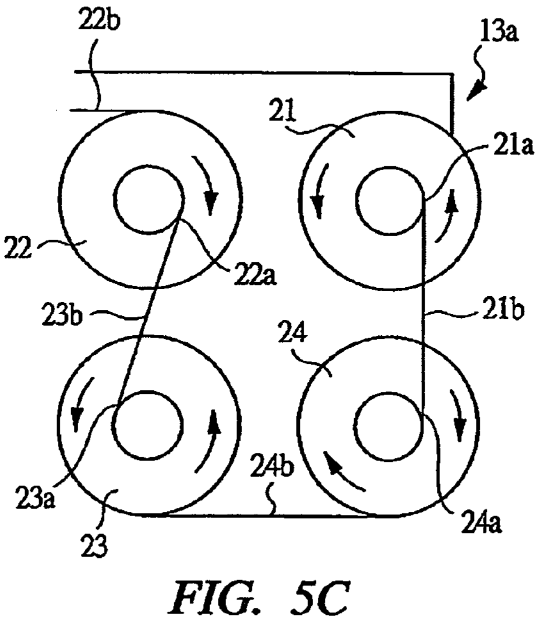
FIG. 5C is a schematic view showing still another connection state.

Furthermore, as shown in FIG. 5C, the four bodies can be connected so that currents in the two coil bodies 22 and 24 flow both in the same direction and those in the other two coil bodies 21 and 23 flow in the opposite directions to each other.

Figure 6A:
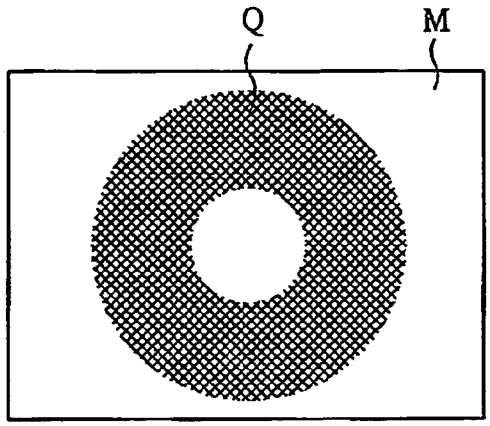
FIGS. 6A to 6F are schematic views showing a temperature distribution of a high-temperature portion when a sheet serving as a conductor is heated by the heating induction coil.

FIG. 6A shows a heating pattern of a single spiral coil, and the pattern is also a heating pattern of a multilayer coil in which the stacked coils of FIG. 4 are concentrically overlapped. Also in any of current carrying manners of FIGS. 5A to 5C, when the stacked portion is reduced, its heating pattern gets closer to the overlapped heating pattern of FIG. 6A. In addition, FIG. 6A also shows a pattern occurring when the concentric multilayer coil of FIG. 4 is heated. It is a schematic view showing a temperature distribution of the case where the adhesive applied to the conductive sheet M is heated by the heating induction coil 13*a* in which the flows of the currents in the overlapping portion of the two coil bodies 21 and 22 are in the opposite directions to each other as shown in FIGS. 3A and 3B. A temperature distribution of the case where the four coil bodies 21 to 24 are connected and stacked as shown in FIG. 5B is also approximately the same.

Figure 6D:
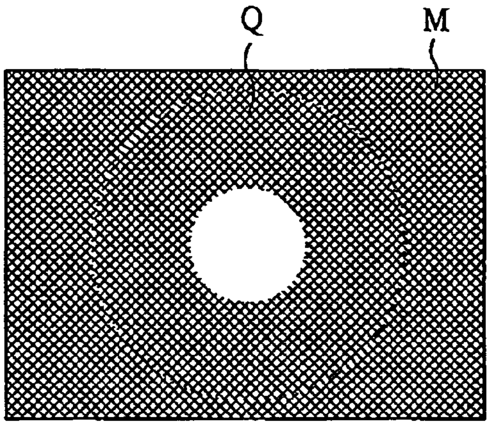
Figure 6B:
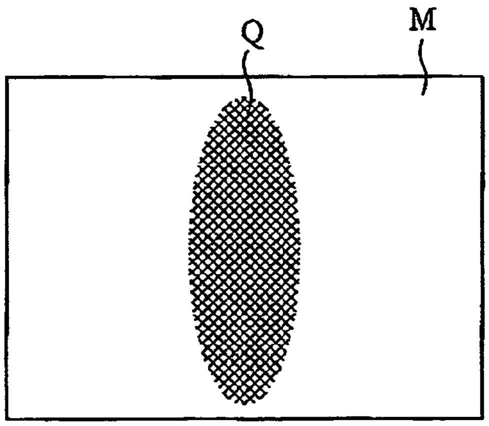

Meanwhile, FIG. 6B is a schematic view showing a temperature distribution of the case where the adhesive applied to the conductive sheet M is heated by the heating induction coil 13*a* in which the flows of the currents in the overlapping portion of the two coil bodies 21 and 22 as shown in FIGS. 3C and 3D are mutually in the same direction. A temperature distribution of the case where the four coil bodies 21 to 24 are connected and stacked as shown in FIG. 5A is also approximately the same. Furthermore, FIG. 6C is a schematic view showing a temperature distribution of the case where the four coil bodies 21 to 24 are connected and stacked as shown in FIG. 5C.

If the flows of the currents in the overlapping portion are set in the opposite directions to each other as shown in FIGS. 3A and 3B, the heating temperature at the overlapping portion is lower than that of the other portion, whereby its outside portion is heated to higher temperature than the overlapping portion as shown in FIG. 6A FIG. 6A shows a state in which a portion Q shown by cross-hatching is heated to higher temperature than the other potion. In contrast, when the flows of the currents in the overlapping portion are mutually set in the same direction as shown in FIGS. 3C and 3D, as shown in FIG. 6B, the induction current caused by the alternating magnetic field of the overlapping portion is superposed and the heating temperature of the overlapping portion becomes higher than that of the other portion. FIG. 6B shows a state in which the portion Q shown by cross-hatching is heated to temperature higher than the other portion. FIG. 6C also shows a state in which the portion Q shown by cross-hatching is heated to temperature higher than the other portion.

Figure 6E:
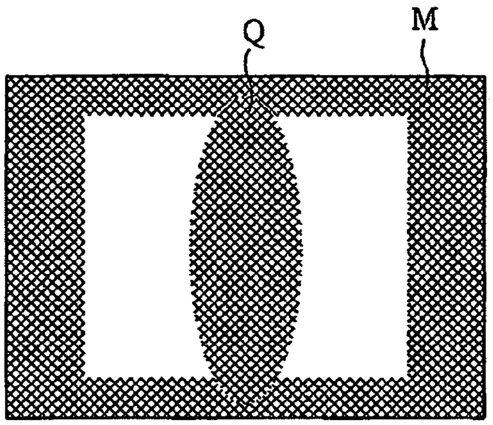
Figure 6C:
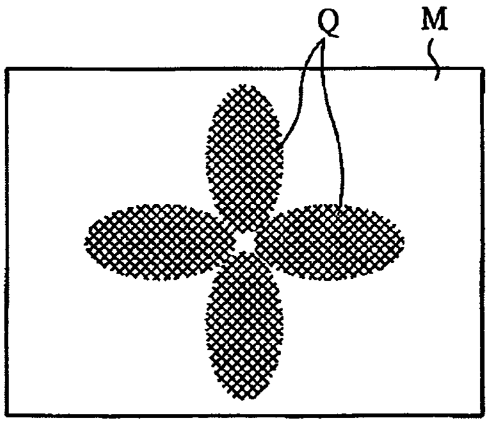
Figure 6F:
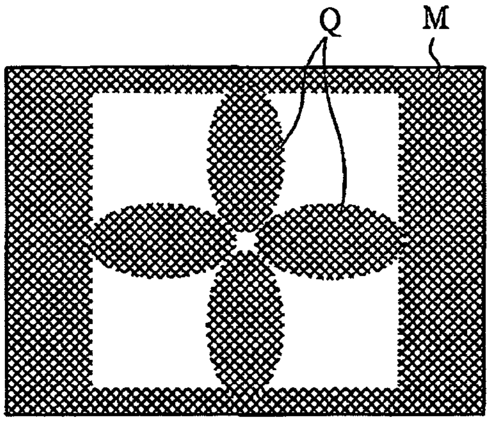

FIGS. 6A to 6C show the temperature distributions of the sheet M in the cases where the sheet M serving as a conductor is larger in size than an outer diameter of the coil. In the case where the sheet M smaller in size than the outer diameter of the coil is heated, the temperature distributions are shown in FIGS. 6D to 6F. FIG. 6D corresponds to the case of being heated by the heating induction coil 13*a* corresponding to that of FIG. 6A; FIG. 6E corresponds to the case of being heated by the heating induction coil 13*a* corresponding to that of FIG. 6B; and FIG. 6F corresponds to the case of being heated by the heating induction coil 13*a* corresponding to that of FIG. 6C.

Thus, since the heating induction coil 13*a* is constituted by a plurality of coil bodies 21 to 24 and each of the coil bodies are overlapped with the other coil bodies, the adhesive corresponding to the overlapping portion can be heated at the temperature different from that of the other portion. Therefore, when the heating head 10 provided with the heating induction coil 13*a* having such a structure is operated to heat the adhesive, the adhesive can be sufficiently heated while poorly heated portions are eliminated by making the head correspond to the object to be heated.

The heating induction coil 13*a* shown in FIG. 3 is provided with the two coil bodies 21 and 22, and the heating induction coil 13*a* shown in FIG. 4 is provided with the four coil bodies 21 to 24. However, when the heating induction coil 13*a* is constituted by a plurality of coil bodies, the number of coil bodies is not limited to two or four and may be arbitrary as long as the coil bodies are mutually stacked so that one coil body is overlapped with another or a plurality of coil bodies. Moreover, the coil bodies 21 and 22 shown in FIG. 3 are oval and the coil bodies 21 to 24 shown in FIG. 2 and FIG. 4 are round. However, as long as the coil form a flat surface or curved surface, the coil body may have an arbitrary shape such as a quadrangle, triangle, ellipse, or polygon, and may be in the form of matching the heating conditions of the conductor.

Figure 7:
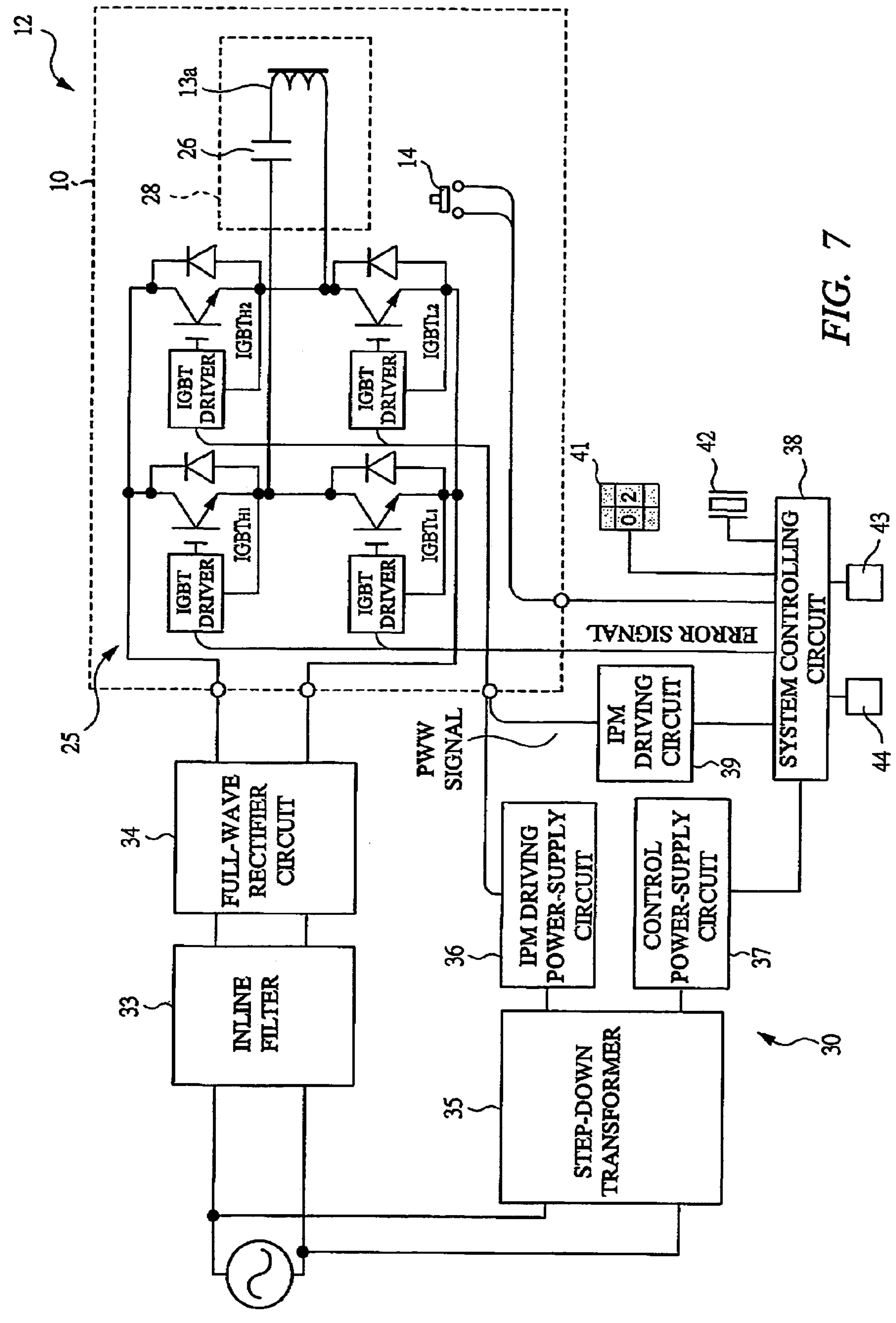
FIG. 7 is a block diagram showing an electric circuit of the portable electromagnetic induction heating device.
Figure 10A:
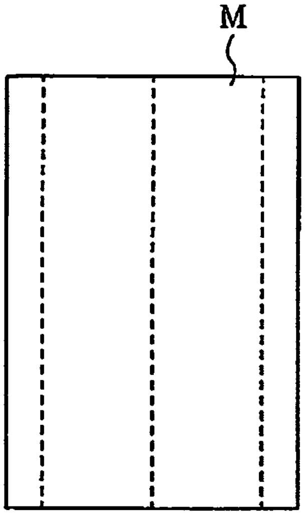
FIGS. 10A to 10E are front views showing a modified example of the metal foil to whose both surfaces the adhesive is provided.
Figure 10B:
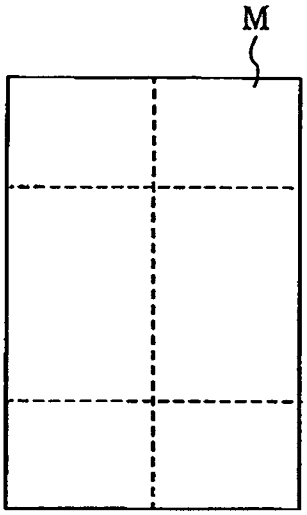
Figure 10C:
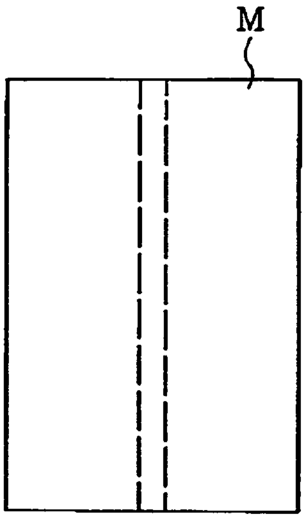
Figure 10D:
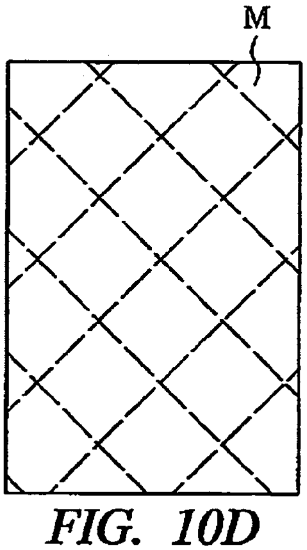
Figure 10E:
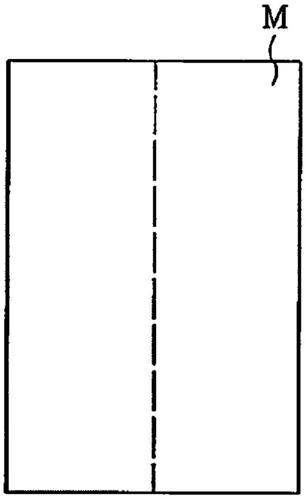

FIG. 7 is a schematic view showing an electrical circuit of a portable electromagnetic induction heating device having the heating induction coil 13*a*. As shown in FIG. 7, a high-frequency generation circuit 25 is built in the head body 12, and the high-frequency generation circuit 25 comprises a plurality of transistors serving as switching elements. The heating induction coil 13*a* is connected to an output terminal of the high-frequency generation circuit 25. A compensating capacitor 26 is connected to the heating induction coil 13*a* in series, and an LC circuit 28 is formed by the heating induction coil 13*a* and the compensating capacitor 26. The LC circuit 28 and the high-frequency generation circuit 25 are integrated, and a section of the high-frequency generation circuit 25 is covered by a shielding member so that a leakage of the magnetic flux from the highfrequency generation circuit 25 can be shielded.

Meanwhile, as shown in FIG. 1, a power-supply cable 32 with a connection plug 31 is provided to the power-supply unit 30, whereby, for example, 200 V single-phase commercial power supply is supplied to the power-supply unit 30. As shown in FIG. 7, the power-supply unit 30 has an inline filter 33 and a full-wave rectifier circuit 34, so that after a noise component in a alternating current waveform of the power supply is removed by the inline filter 33, the current is rectified to a direct current by the full-wave rectifier circuit 34. The direct current is supplied to the high-frequency generation circuit 25 in the heating head 10 by the cable 40 as described above.

A step-down transformer 35 is built in the power-supply unit 30, so that the commercial power supply is transformed to have a low voltage by the step-down transformer 35 and the current is sent to an IPM (intelligent power module) driving power-supply circuit 36 and a control power-supply circuit 37. A direct current is supplied from the control power-supply circuit 37 to a system controlling circuit 38, and a control signal is sent from an IPM driving circuit to the high-frequency generation circuit 25 by a PWM (pulse wide modulation) signal from the system controlling circuit 38. Consequently, the control signal is sent from the power-supply unit 30 to each of the switching elements, which are built in the heating head 10 and constitute the high-frequency generation circuit 25, whereby a high-frequency current with a predetermined frequency, for example, a wavelength of 200 kHz is supplied to the LC circuit 28.

A trigger switch 14 to be operated by an operator is provided to the heating head 10, so that when the switch 14 is operated, the signal thereof is sent to the system controlling circuit 38 of the power-supply unit 30 and supply of a high-frequency current to the heating induction coil 13*a* is started. A current carrying time for the heating induction coil 13*a* is set by a signal from an operation timer 41 to the system controlling circuit 38, and the current carrying time can be set to an arbitrary time by adjusting the timer 41. Furthermore, a buzzer 42 is provided in the power-supply unit 30, so that although the buzzer 42 operates while a current is supplied to the heating induction coil 13*a*, an LED may be lighted instead. Note that the buzzer 42 may operate or the IMP driving power-supply circuit 36 may stop when an error occurs, for example, when the current or voltage exceeds a set value or the temperature is equal to or higher than a predetermined value. Also, the LED may be lit up only when an appropriate current is supplied to the heating induction coil 13*a*.

A detection signal from a temperature sensor 43 for detecting the temperature of the adhesive is send to the system controlling circuit 38. When the adhesive reaches the predetermined temperature, the current carried to the induction coil is stopped before a time set by the timer 41 elapses. When the adhesive does not reach the predetermined temperature even after the time set by the timer 41 elapses, the time set by the timer 41 is corrected so that the current carrying time is extended up to a certain time at most. Furthermore, a detection signal from an outside air temperature sensor 44 for detecting outside air temperature is send to the system controlling circuit 38, so that the time set by the timer 41 is corrected in accordance with the outside air temperature. However, whether the time set by the timer 41 is corrected by one or both of the temperature sensor 43 and the outside air temperature sensor 44 or whether the current carrying time is set only by the timer 41 may be selected by a selector switch.

As described above, since the LC circuit 28 is constituted by the heating induction coil 13*a* and the compensating capacitor 26 connected thereto in series, AC resistance of the LC circuit 28 can be reduced by using the serial type LC circuit 28. For example, when a value of the compensating capacitor 26 is adjusted in the case where a high-frequency current of 20 kKz is generated by the high-frequency generation circuit 25 and supplied to the LC circuit 28, the inductance of the LC circuit 28 can be reduced to one tenth, i.e., from 600 μH to about 60 μH, and the AC resistance of the LC circuit 28 can be set at about 10 Ω. Consequently, the current supplied to the heating induction coil 13*a* can be increased about ten times, whereby a magnetic flux density is increased. Thus, since a resistance value required for the LC circuit 28 is set, a value of the current flowing in the heating induction coil 13*a* is increased, whereby a heating capability can be improved. By combining these devices, even adhesive applied to a large region can be efficiently heated.

As shown in FIG. 7, since the high-frequency generation circuit 25 is built in the heating head 10, the output terminal of the high-frequency generation circuit 25 is directly connected to the heating induction coil 13*a*. Thereby, in comparison with the case of providing the high-frequency generation circuit on a side of the power-supply unit and supplying the high-frequency current to the heating unit via the cable, it is possible to reduce transmission loss, simultaneously improve power factors, and reduce reactive power. In addition, although providing a thick coating on the cable is required when the high-frequency current flows in the cable, it becomes unnecessary to provide the coating.

The heating head 10 connected to the power-supply unit 30 via the cable 40 is attachable/detachable to the power-supply unit 30, and the heating head 10 can be separated from the power-supply unit 30. When the interior material or the like of the building is bonded by using the portable electromagnetic induction heating device as shown in FIG. 1, for example, the size of the heating induction coil 13*a* is preferably changed depending on, for example, the thickness of the interior material, property of the adhesive, and the area of the bonding member. Therefore, a plurality of the heating heads 10 are prepared as corresponding to types of heating operations, and the heating head 10 is replaced as corresponding to the types of heating operations. Accordingly, by using the common power-supply unit 30 to be connected to the arbitrary heating head via the cable 40, any of the plurality of heating heads 10 can be driven. Also, if a plurality of power-supply units 30 can be prepared as corresponding to, for example, commercial voltages or output voltages, the power-supply unit 30 can be replaced depending on the heating head 10.

FIG. 1 shows a state in which the metal foil, i.e., the conductive sheet M to which the adhesive S1 and S2 are applied is used to melt the adhesive S1 and S2 by the sheet M and bond the two members W1 and W2. Thereby, even when the bonded members W1 and W2 are peeled off, the adhesive S1 and S2 can be melted by using the portable electromagnetic induction heating device. Thus, the portable electromagnetic induction heating device according to the present invention can be used for attaching and/or peeling off the interior materials and exterior materials of the house onto and/or from the building frame by the adhesive.

FIGS. 8A to 8C are perspective views showing modified examples of the conductor, i.e., the metallic sheet M to whose both surfaces the adhesive is provided. The sheets M shown in FIGS. 8A and 8B are rectangular and formed by cutting a metal belt-shaped material at a predetermined length. A perforation T extending along a longitudinal direction is formed as a resistance barrier portion at a center portion of the sheet M in a width direction, whereby the sheet M is divided into two designed regions. Meanwhile, the sheet M shown in FIG. 8C is rectangular and is also formed by cutting a metal belt-shaped material at a predetermined length. Two perforations T extending in directions of connecting two opposing corners are formed as two resistance barrier portions in the sheet M, whereby the sheet M is divided into four designed regions each formed into an approximately triangle. Note that the resistance barrier portions may be incisions Ta other than perforations T as shown in FIG. 8C. As long as the electrical resistance of the resistance barrier portions is set smaller than those of the other portions of the sheet M, linear resistance barrier portions can be formed by forming portions in which a metal structure is not continuous by perforations T or incisions Ta.

Since the above-described portable electromagnetic induction heating device is used to make the sheet M serving as a conductor generate heat and to heat the adhesive, the interior materials or exterior materials of the house can be attached to the building frame by the adhesive. For example, by using the sheet M shown in FIG. 8A, boards can be mutually bonded in constructing a house using two-by-four (2×4) building materials. By using the sheet M shown in FIG. 8B, tiles can be bonded to the building frame. Note that the above-described portable electromagnetic induction heating device can be used even when the bonded wood and/or tiles are peeled off.

FIG. 9A is a plan view showing a state in which the sheet M shown in FIG. 8B is used to heat the adhesive provided on both surfaces thereof, and FIG. 9B is a plan view showing a state in which the sheet M shown in FIG. 8C is used to heat the adhesive provided on both surfaces thereof.

As shown in the Figures, when the sheet M is divided into a plurality of regions by perforations T or incisions Ta, the metal structure is not continuous at portions cut for forming the perforations, so that the electrical resistance at a portion along the perforations T or incisions Ta becomes larger than that of the other portions and the portion of the perforations T or incisions Ta serves as a barrier portion with large electrical resistance. Therefore, when the current flows in the heating induction coil 13*a*, a large quantity of eddy currents as shown by arrows flow in each of regions divided and included in a state in which the metal structure is continuous, so that the eddy currents are dispersed and generated in the sheet M. That is, when the perforations T are not provided, a portion of the sheet M intensively generates heat since the eddy currents flow intensively in a donut-shaped portion corresponding to a shape of an outer peripheral portion of the heating induction coil 13*a*. However, when the sheet M is divided into the plurality of regions by the resistance barrier portions comprising the perforations T, incisions Ta, or the like, the eddy current divided by the resistance barrier portions such as the perforations T as boundaries flow in an opposite direction. As a result, no bias of a heat generating portion occurs and the heat generation temperature is dispersed in whole.

FIGS. 10A to 10E are views showing modified examples of the perforations T formed in the sheet M, wherein the perforations T can be arbitrarily set depending on, for example, a use application of the sheet M. Incisions may be formed in the sheet M instead of the perforations T.

Figure 11A:
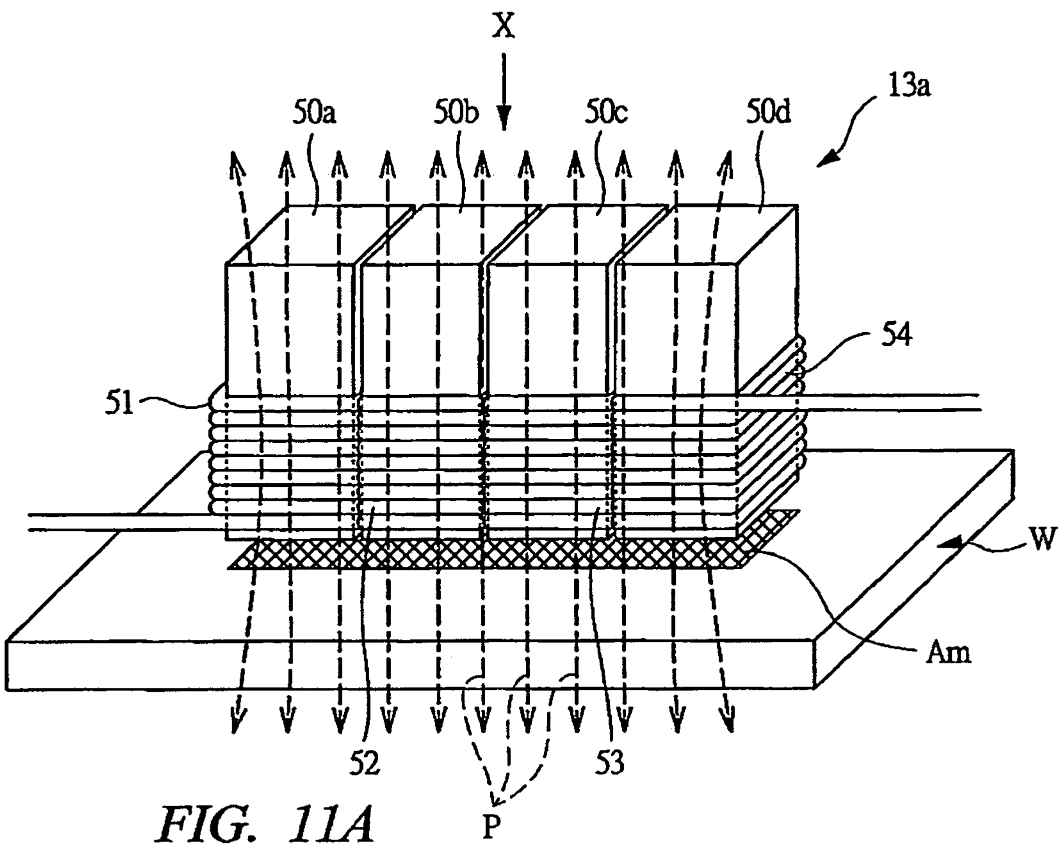
FIG. 11A is a plan view showing another specific example of the heating induction coil.
Figure 11B:
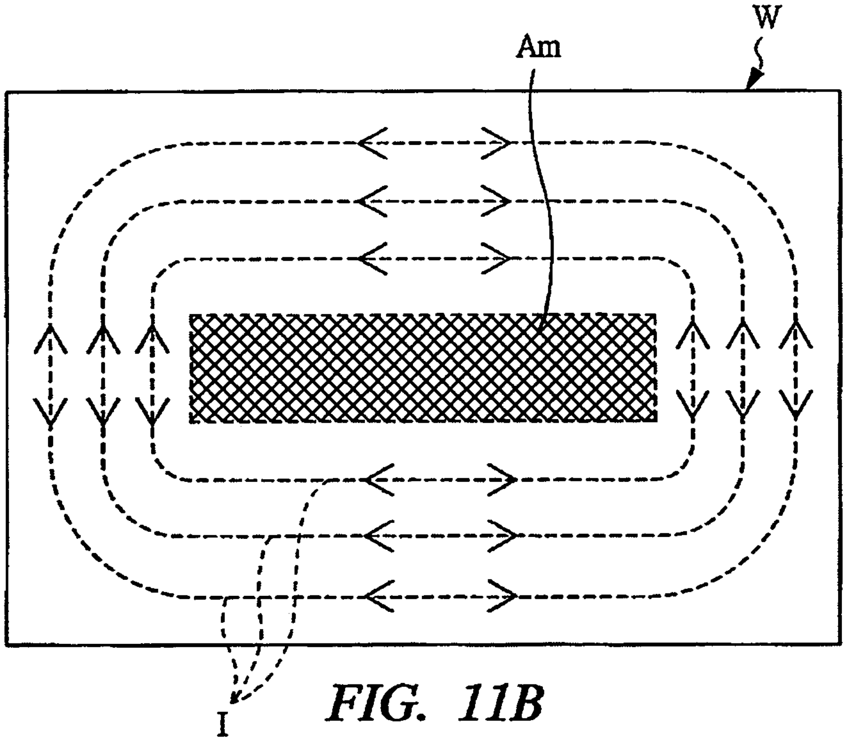
FIG. 11B is a plan view showing eddy currents generated in a conductor by the heating induction coil shown in FIG. 11A.

FIG. 11A is a perspective view showing a heating induction coil 13*a* of a portable electromagnetic induction heating device which is another embodiment of the present invention; and FIG. 11B is a plan view showing paths of eddy currents flowing in the conductor W when the conductor W is made to generate heat by using the heating induction coil 13*a*.

The heating induction coil 13*a* has four rod-like magnetic cores 50*a* to 50*d*, each of which is made of a magnetic material with high magnetic permeability such as ferrite or iron. Coil bodies 51 to 54 are wound around the magnetic cores 50*a* to 50*d*, respectively, and the four magnetic core coils 50*a* to 50*d* are combined. When tip surfaces of the magnetic cores 50*a* to 50*d* are faced to the conductor W and the currents are carried to the coil bodies 51 to 54, as shown in FIG. 11, alternating magnetic force lines P pass through a magnetic force line passing region Am and eddy currents I are created also in a surrounding region including the magnetic force line passing region Am by the electromagnetic induction effect. As a result, the conductor W can be heated.

Thus, since the coil bodies 51 to 54 are wound around the magnetic cores 50*a* to 50*d*, efficiency of generating the eddy currents is improved and the eddy currents I are created in a state of having a little bias in whole close to, for example, corners of the rectangular conductor W, whereby the entirety of the conductor W can be heated.

Figure 12A:
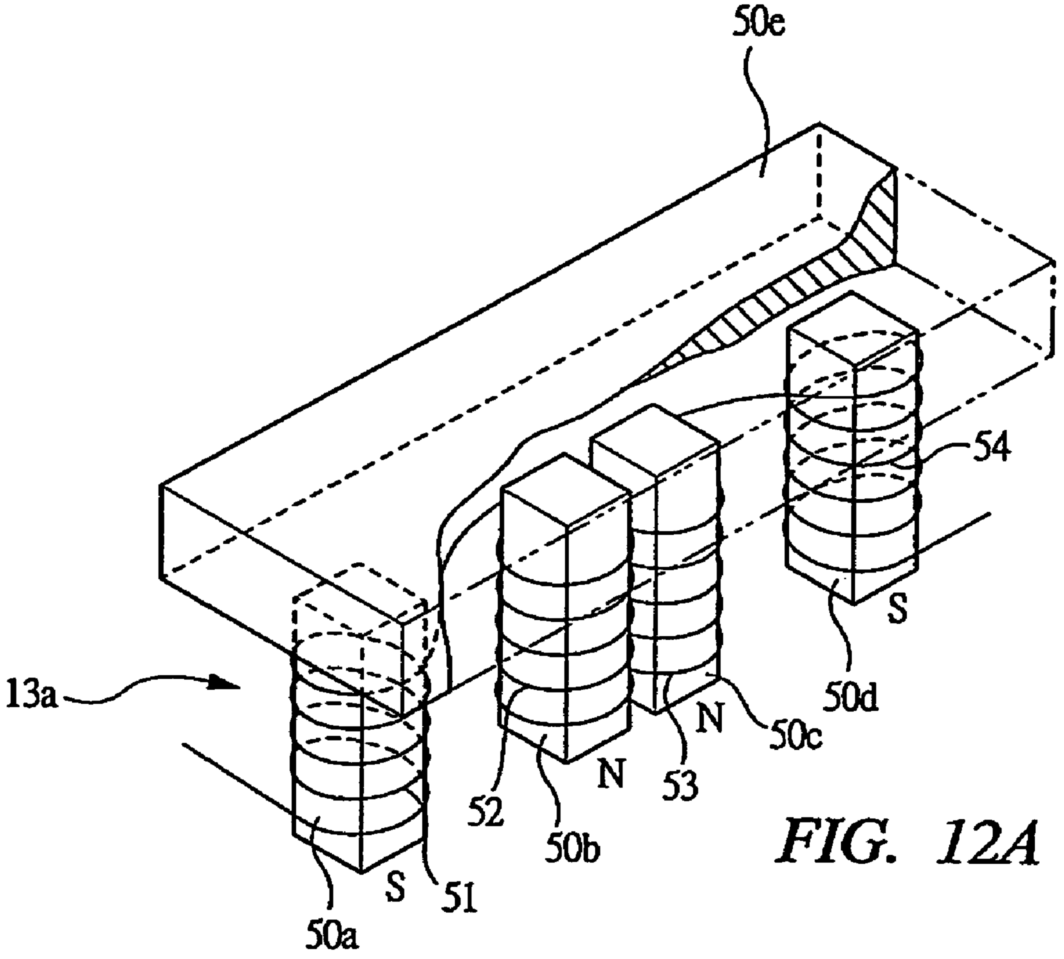
FIG. 12A is a plan view showing another specific example of the heating induction coil.
Figure 12B:
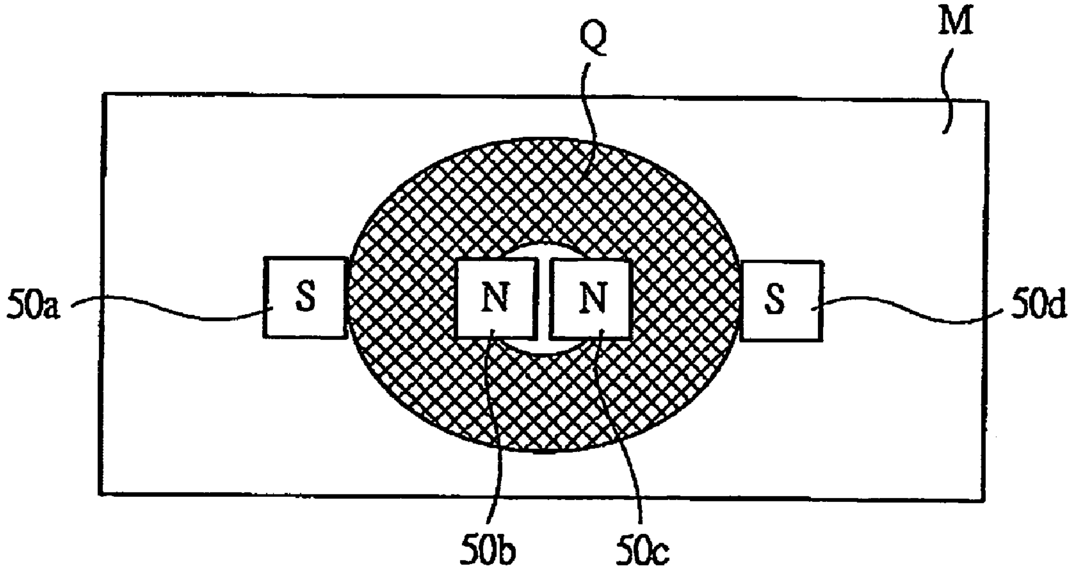
FIG. 12B is a schematic view showing a temperature distribution of the high-temperature portion when the sheet serving as a conductor is heated by the heating induction coil shown in FIG. 12A.

FIG. 12A is a partly-broken perspective view showing a heating induction coil 13*a* of a portable electromagnetic induction heating device which is still another modified example of the present invention; and FIG. 12B is a schematic view showing a temperature distribution of the case where the adhesive applied to the conductive sheet M is heated by the heating induction coil 13*a*. The heating induction coil 13*a* has four magnetic cores 50*a* to 50*d* which are parallel to one another and arranged in a straight line, wherein the two magnetic cores 50*b* and 50*c* disposed in the middle are combined and the two magnetic cores 50*a* and 50*d* disposed outside are away. Rear ends of the magnetic cores 50*a* to 50*d* are integrally coupled to a magnetic force line guiding member 50*e*, and the coil bodies 51 to 54 are respectively wound around them. Accordingly, when currents are carried to the coil bodies 51 to 54, the magnetic force lines generated in the magnetic cores 50*a* to 50*d* permeate the magnetic force line guiding member 50*e*. Thereby, the magnetic force lines can be prevented from leaking to the outside, and efficiency of generating the eddy currents can be improved.

Regarding winding directions of the coil bodies 51 to 54 shown in FIG. 12A, the two outside coil bodies 51 and 54 have the same direction, and the two inside coil bodies 52 and 53 have mutually the same direction which is opposite to the directions of the two outside coil bodies 51 and 54. Therefore, when the tips of the two outside magnetic cores 50*a* and 50*d* have south poles, the two inside magnetic cores 50*b* and 50*c* have north poles. When the winding directions are set in the above-described manner, as shown in FIG. 12B, an annular portion in the sheet M, which runs through portions corresponding to regions between the outside and inside magnetic cores 50*a* and 50*b* and between the outside and inside magnetic cores 50*d* and 50*c*, becomes a portion Q heated at temperature higher than that of the other portions.

Figure 13A:
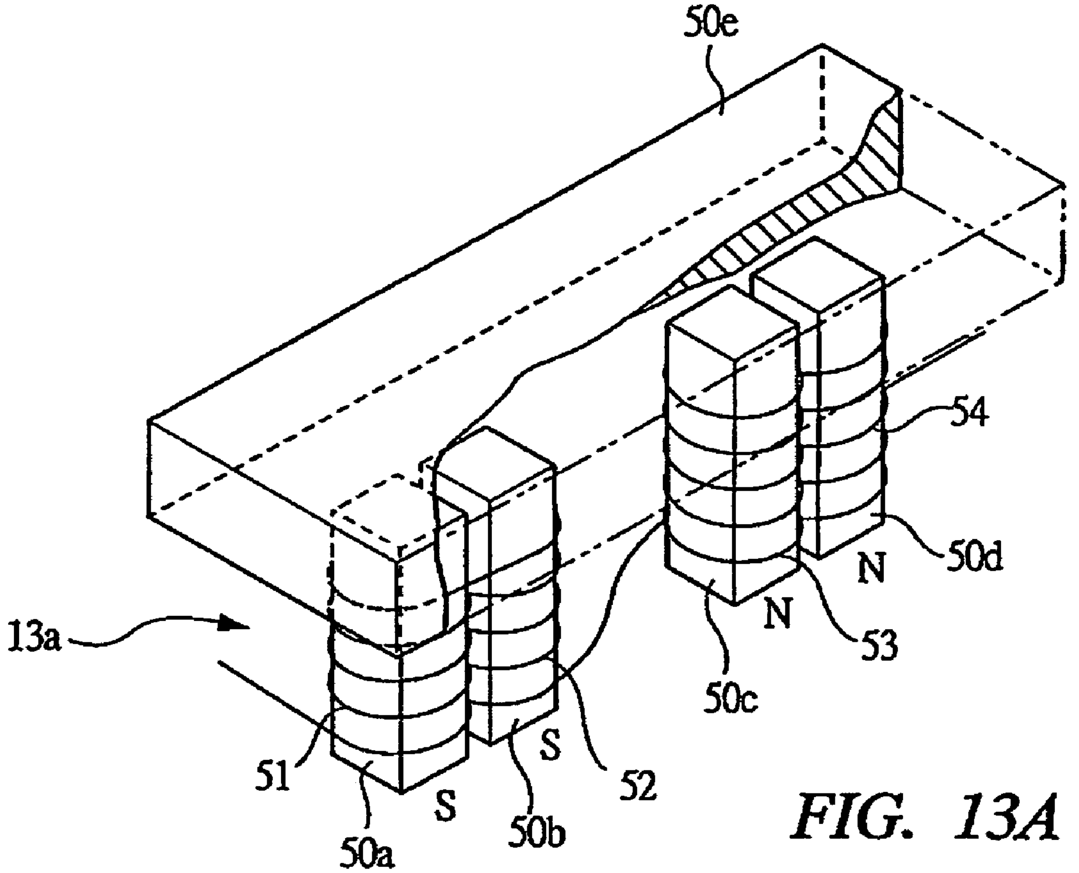
FIG. 13A is a plan view showing another specific example of the heating induction coil.
Figure 13B:
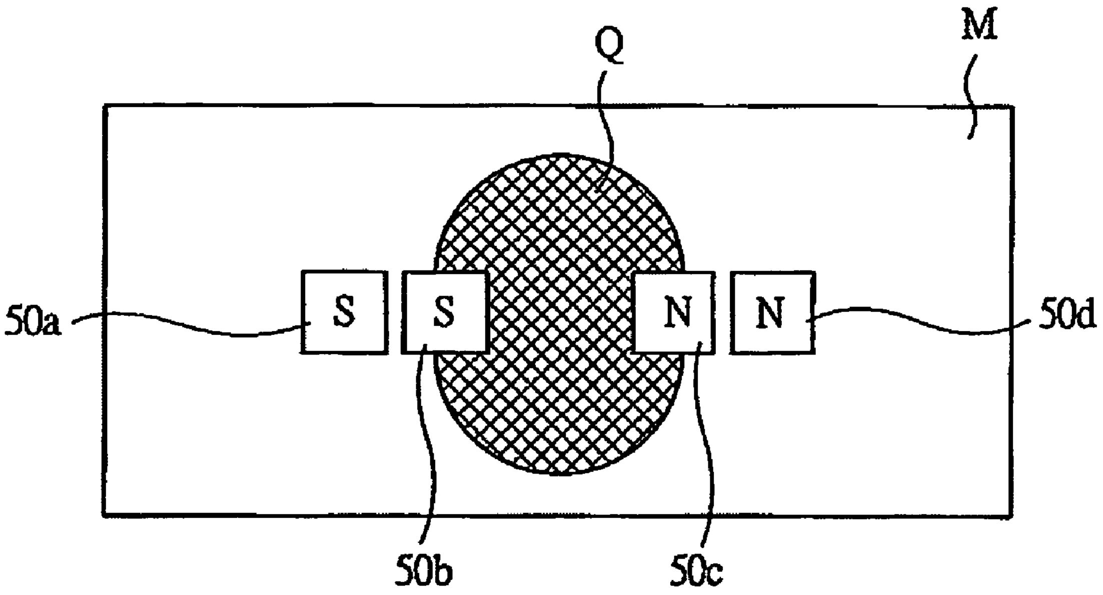
FIG. 13B is a schematic view showing a temperature distribution of the high-temperature portion when the sheet serving as a conductor is heated by the heating induction coil shown in FIG. 13A.

FIG. 13A is a partly-broken perspective view showing a heating induction coil 13*a* of a portable electromagnetic induction heating device which is still another modified example of the present invention; and FIG. 13B is a schematic view showing a temperature distribution of the case where the adhesive applied to the conductive sheet M is heated by the heating induction coil 13*a*. The heating induction coil 13*a* has, similarly to the case shown in FIG. 12A, the four magnetic cores 50*a* to 50*d* which are parallel to one another and arranged in a straight line, wherein the two magnetic cores 50*a* and 50*b* arranged on one side are combined and the two magnetic cores 50*c* and 50*d* arranged on the other side are also combined. The rear ends of the magnetic cores 50*a* to 50*d* are integrally coupled to the magnetic force line guiding member 50*e*, and the coil bodies 51 to 54 are respectively wound around them.

Regarding the winding directions of the coil bodies 51 to 54 shown in FIG. 13A, the outside coil body 51 and the inside coil body 52 adjacent thereto have the same direction and the outside coil body 54 and the inside coil body 53 adjacent thereto have the same direction. However, the direction of the two coil bodies 51 and 52 and that of the two coil bodies 53 and 54 are opposite to each other. Therefore, when the tips of the two magnetic cores 50*a* and 50*b* have south poles, the two magnetic cores 50*c* and 50*d* have north poles. Since the winding directions are set in the above-described manner, as shown in FIG. 13B, a portion in the sheet M corresponding to a region between the inside magnetic cores 50*b* and 50*c* becomes the portion Q heated to temperature higher than that of the other portions.

Figure 14A:
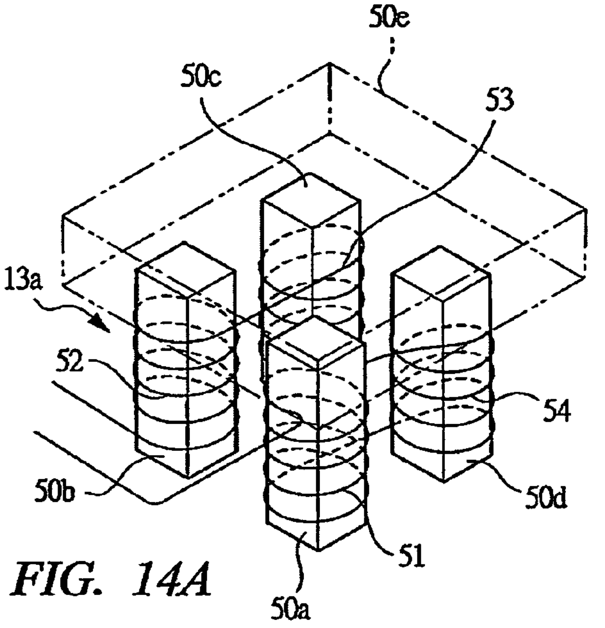
FIG. 14A is a plan view showing another specific example of the heating induction coil.

FIG. 14A is a perspective view showing a heating induction coil 13*a* of a portable electromagnetic induction heating device which is still another embodiment of the present invention, wherein the four magnetic cores 50*a* to 50*d* are integrated with the magnetic force line guiding member 50*e* so that a center portion thereof is quadrangular. Since the magnetic cores 50*a* to 50*d* are arranged in this manner, the generation distribution of the eddy currents generated in the conductor W can be changed by changing the winding directions of the coil bodies 51 to 54 wound around the respective magnetic cores.

Figure 14B:
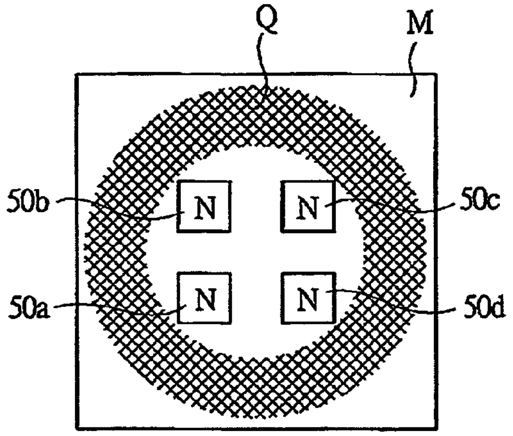
FIGS. 14B to 14D are schematic views showing a temperature distribution of the high-temperature portion when the sheet serving as a conductor is heated by the heating induction coil shown in FIG. 14A.

FIG. 14B is a view showing a heat generation state of the sheet M due to the eddy currents created in the conductor, i.e., the sheet M when the magnetic cores 50*a* to 50*d* are arranged in the manner shown in FIG. 14A and all of the winding directions of the coil bodies 51 to 54 are set in the same directions. Thereby, the eddy currents generated in the conductor W by the coil bodies 51 to 54 are overlapped, so that an annular shape disposed outside the magnetic cores 50*a* to 50*d* and generating the large eddy current is generated.

Figure 14C:
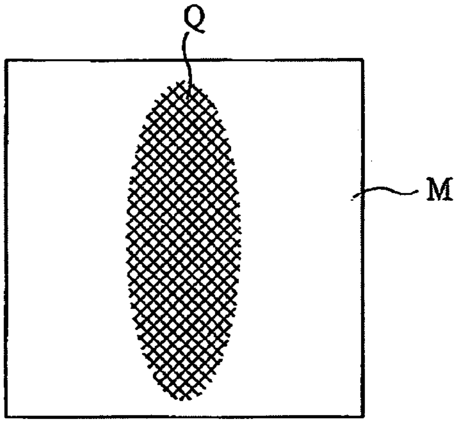
Figure 14D:
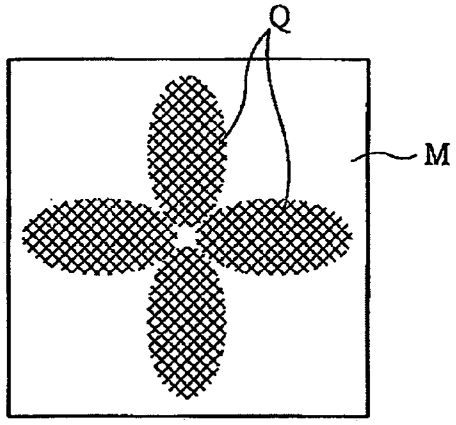

FIGS. 14C and 14D are views showing a heat generation state of the cases where the polarities of the magnetic cores 50*a* to 50*d* are changed by varying the winding directions of the coil bodies 51 to 54. FIG. 14C shows the case where the polarities of the two magnetic cores 50*a* and 50*b* are the same, and the polarities of the two magnetic cores 50*c* and 50*d* are set to be mutually the same and different from the polarities of the two magnetic cores 50*a* and 50*b*. In addition, FIG. 14D shows the case in which the polarities of the two magnetic cores 50*a* and 50*c* are the same and the polarities of the two magnetic cores 50*b* and 50*d* are set to be mutually the same and different from the polarities of the two magnetic cores 50*a* and 50*c*.

Also in the cases shown in FIG. 12 to FIG. 14, the region of the eddy currents generated in the conductor can be adjusted by changing the respective mutual distances between the respective magnetic cores 50*a* to 50*d* and the number of magnetic cores can be arbitrarily set.

As described above, when the heating induction coil 13*a* is constituted by the plurality of coil bodes, the plurality of coil bodies may be connected in series or in parallel. When it is constituted by the four coil bodies, two of them may be connected in series to each other to form a pair of coil assemblies, whereby two pairs of coil assemblies may be connected to each other in parallel.

When the metal to whose both surfaces the adhesive is applied is used, the interior material or exterior material serving as an object to be heated by the portable electromagnetic induction heating device of the present invention is not limited to a wooden member and may be any member as long as it is a nonconductive member such as a rubber sheet, gypsum board, or tile. Therefore, the present invention can be used to bond a rubber sheets to a ceiling of the house or bond a finishing cloth to a surface of the interior material. In addition, even when the members are peeled off or separated by melting the adhesive in the state in which these are bonded, the portable electromagnetic induction heating device can be used.

Also, when the nonconductive member such as a plaster board is bonded to a metallic pillar, without using the conductor such as metal foil or a metal net and in a state in which the adhesive is interposed between the metallic pillar and the nonconductive member, the metallic pillar is made to generate heat by the portable electromagnetic induction heating device and the adhesive is heated and melted by the generated heat Thereby, both can be bonded and the two members bonded can be separated by melting the adhesive. Similarly thereto, the portable electromagnetic induction heating device of the present invention can be used even in the case of bonding two metallic members by the adhesive or separating the two bonded members by melting the adhesive.

As described above, as long as both of or one of the two members to be bonded to each other is a conductive member (s), in a state of interposing the adhesive therebetween, the object(s) to be bonded per se is made to generate heat by the portable electromagnetic induction heating device and the generated heat is transmitted to the adhesive. Thereby, it is possible to bond the members or separate the bonded members. In contrast, when both members are nonconductive, in a state in which aluminum or steel metal foil or a metal net to whose both surfaces the adhesive is applied is interposed between the both members, the metal foil or metal net is made to generate heat and the generated heat is transmitted to the adhesive. Thereby bonding or separation can be carried out.

Therefore, since the portable electromagnetic induction heating device is used to melt the adhesive, the two members to be bonded by the adhesive or separated from the bonded state are not limited to the interior materials and/or exterior materials and the building frame, and bonding and separation of various members can be performed.

For example, when tents or domes produced by using the sheet materials are produced, the portable electromagnetic induction heating device of the present invention can be applied for heating the adhesive in bonding the sheet materials to each other by the adhesive and also applied for bonding and separation of the sheet materials such as carpets. In addition, the device can be applied even when a large quantity of products such as automobile parts and electronic parts are bonded by the adhesive, and can be also applied for reusing the members by meting the adhesive and disassembling them.

The present invention can be applied for joining the two members by using the adhesive and for separating the two bonded members from each other, and can be applied to both of the cases where both of the members to be bonded are nonconductive members and where at least one of them is a conductive member.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. The portable electromagnetic induction heating device for carrying an induction current in a conductor, making said conductor generate heat by Joule's heat, and heating adhesive by the heat generating conductor, the device comprising:

a power-supply unit for supplying electric power;

a heating head provided with a high-frequency generation circuit for converting a current supplied from said power-supply unit to a high-frequency current; and a heating induction coil to which a current from the high frequency generation circuit is supplied and which generates an induction current in said conductor, wherein said heating induction coil has a facing surface wherein an efficiency of generating an eddy current is improved by winding said coil body around a magnetic core with a tip surface facing said conductor and by forming a magnetic circuit concentrating a facing magnetic force line and converging a magnetic force line in a space opposite to the conductor wherein a region of the generated eddy current is adjusted by connecting windings of a plurality of said magnetic cores at respective rear ends thereof and by changing a polarity and a position of a magnetic force line formed by said heating induction coil including a flat surface or curved surface facing said conductor, and is formed by a coil body with a shape of one or more circles, ovals, or polygons to be capable of surface-heating a complex three-dimensional curved surface.

* * * * *